(12) United States Patent
Lyons

(10) Patent No.: US 11,130,538 B1
(45) Date of Patent: Sep. 28, 2021

(54) MOTORCYCLIST GROIN PROTECTOR

(71) Applicant: Tyrone Lyons, Middletown, NY (US)

(72) Inventor: Tyrone Lyons, Middletown, NY (US)

( * ) Notice: Subject to any disclaimer, the term of this patent is extended or adjusted under 35 U.S.C. 154(b) by 239 days.

(21) Appl. No.: 16/451,230

(22) Filed: Jun. 25, 2019

(51) Int. Cl.
*B62J 23/00* (2006.01)

(52) U.S. Cl.
CPC ..................... *B62J 23/00* (2013.01)

(58) Field of Classification Search
CPC ........................................................ B62J 23/00
USPC ........................................................ 280/304.3
See application file for complete search history.

(56) References Cited

U.S. PATENT DOCUMENTS

| D134,578 S | 12/1942 | Du | |
|---|---|---|---|
| 4,068,859 A | 1/1978 | Dittman | |
| 5,511,822 A * | 4/1996 | Wolanski | B62J 25/00 |
| | | | 280/770 |
| 6,062,601 A * | 5/2000 | Willie | B62J 23/00 |
| | | | 150/167 |
| 7,258,357 B1 * | 8/2007 | Berezny | B62J 1/12 |
| | | | 280/288.4 |
| 7,367,577 B1 * | 5/2008 | Garrett | B62J 21/00 |
| | | | 280/288.4 |
| D686,115 S * | 7/2013 | Saggau | D12/126 |
| 2008/0290704 A1 | 11/2008 | Chipkar | |
| 2011/0120795 A1 * | 5/2011 | Roby | B62J 23/00 |
| | | | 180/219 |

FOREIGN PATENT DOCUMENTS

GB            2432817           10/2007

* cited by examiner

*Primary Examiner* — Kevin Hurley
*Assistant Examiner* — Felicia L. Brittman
(74) *Attorney, Agent, or Firm* — Kyle A. Fletcher, Esq.

(57) ABSTRACT

The motorcycle groin protector is a guard. The motorcycle groin protector is configured for use with a motorcycle. The motorcycle is further defined with a fuel tank. The motorcycle groin protector forms a guard around a groin of a rider. The motorcycle groin protector comprises a rigid shell, a clip, and a comfort cushion. The clip attaches the rigid shell to the fuel tank of the motorcycle. The comfort cushion attaches to the rigid shell. The rigid shell forms the guard around a groin of a rider.

18 Claims, 4 Drawing Sheets

US 11,130,538 B1

MOTORCYCLIST GROIN PROTECTOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of land transportation including cycle seats, more specifically, a protector specially adapted for a cycle. (B62J23/00)

SUMMARY OF INVENTION

The motorcycle groin protector is a guard. The motorcycle groin protector is configured for use with a motorcycle. The motorcycle is further defined with a fuel tank. The motorcycle groin protector forms a guard around a groin of a rider. The motorcycle groin protector comprises a rigid shell, a clip, and a comfort cushion. The clip attaches the rigid shell to the fuel tank of the motorcycle. The comfort cushion attaches to the rigid shell. The rigid shell protects the groin of a rider.

These together with additional objects, features and advantages of the motorcycle groin protector will be readily apparent to those of ordinary skill in the art upon reading the following detailed description of the presently preferred, but nonetheless illustrative, embodiments when taken in conjunction with the accompanying drawings.

In this respect, before explaining the current embodiments of the motorcycle groin protector in detail, it is to be understood that the motorcycle groin protector is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the motorcycle groin protector.

It is therefore important that the claims be regarded as including such equivalent construction insofar as they do not depart from the spirit and scope of the motorcycle groin protector. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
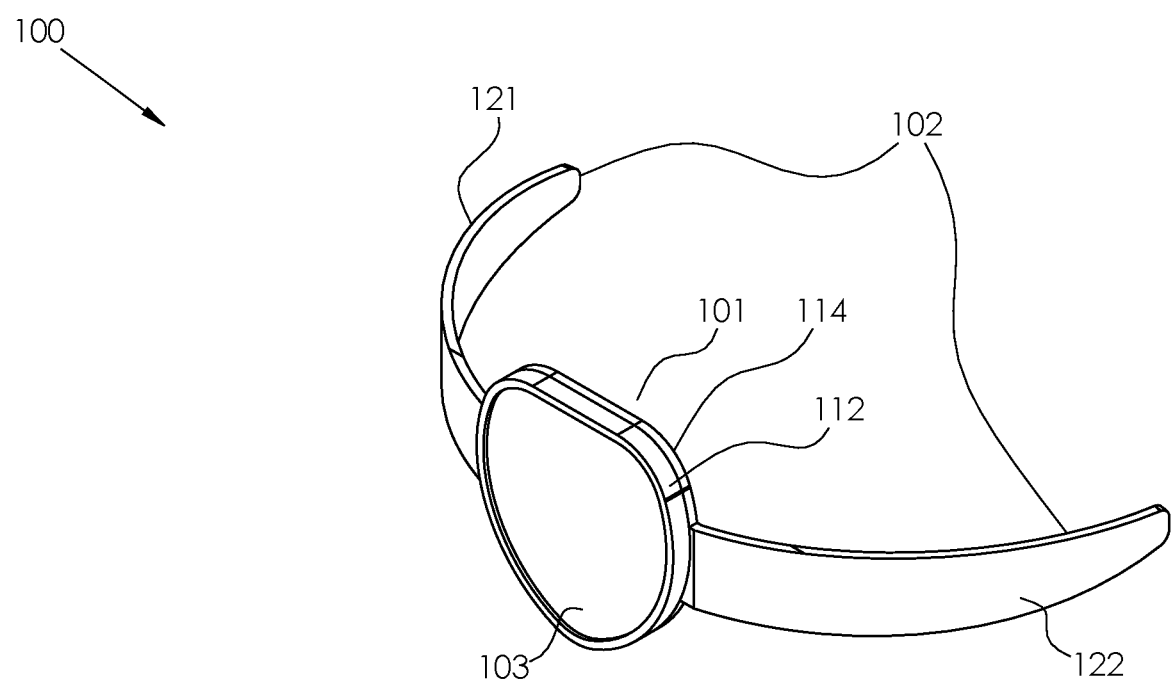
FIG. 1 is a perspective view of a device of the disclosure.
Figure 2:
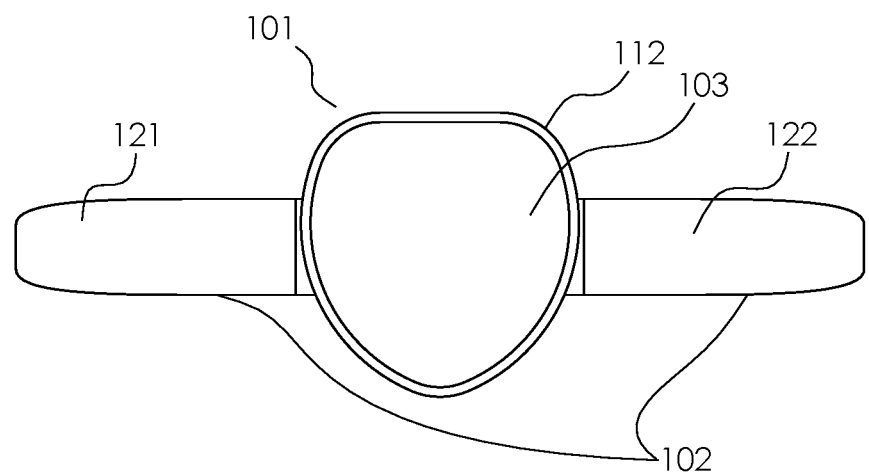
FIG. 2 is a top view of a device of the disclosure.
Figure 3:
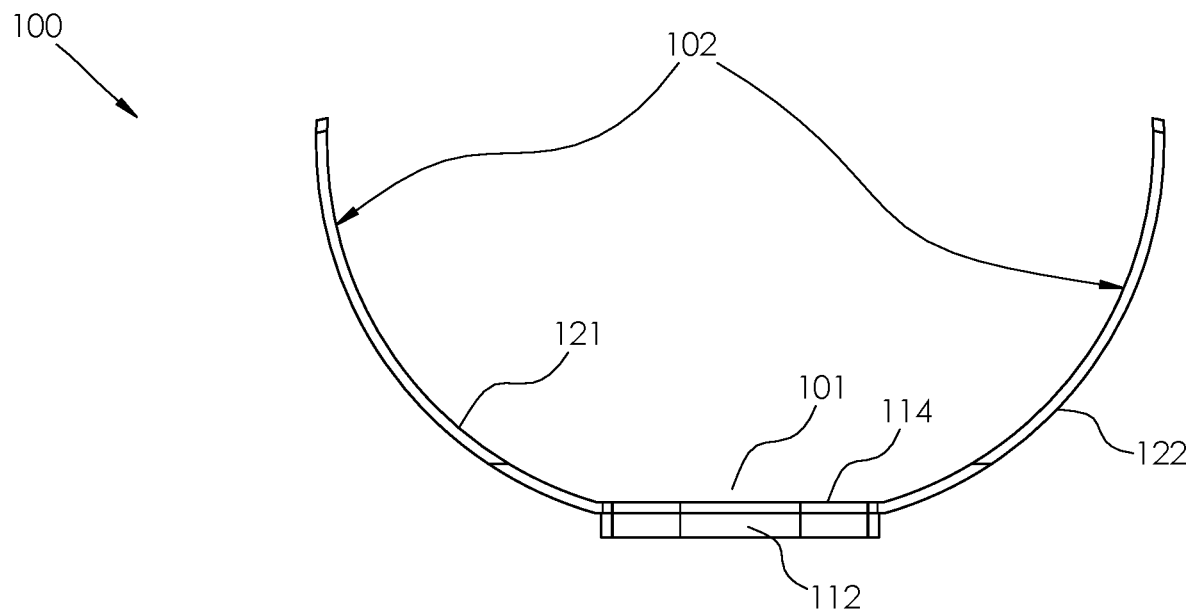
FIG. 3 is a front view of a device of the disclosure.
Figure 4:
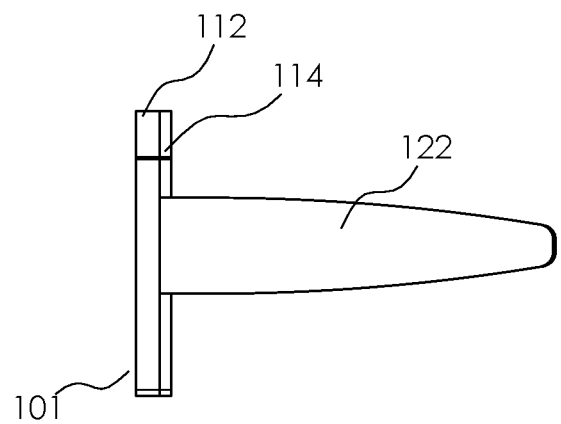
FIG. 4 is another side view of a device of the disclosure.
Figure 5:
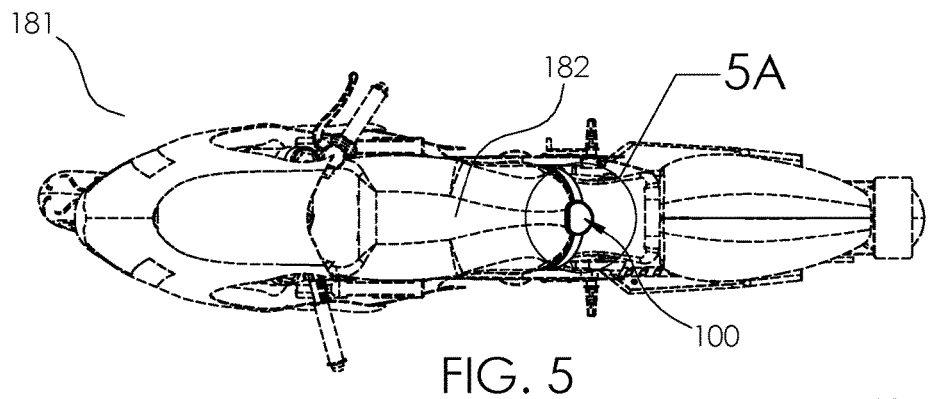
FIG. 5 is a top in-use view of a device of the disclosure.
Figure 5A:
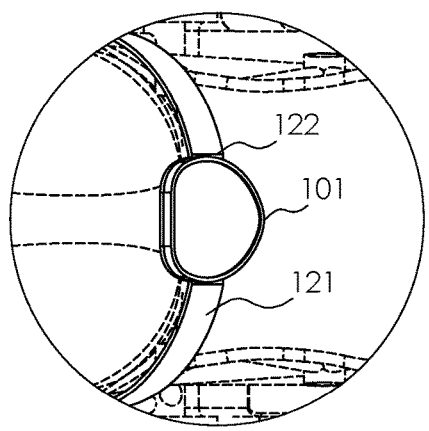
FIG. 5A is a detail view of a device of the disclosure.
Figure 6A:
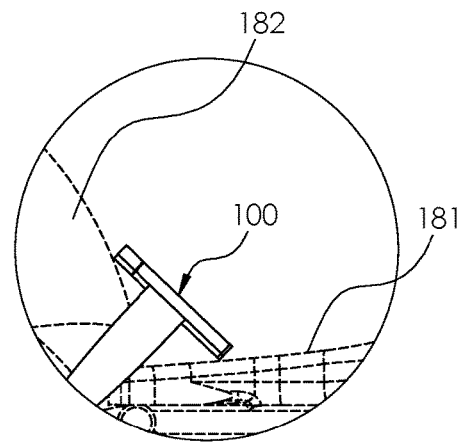
FIG. 6A is a detail view of a device of the disclosure.
Figure 6:
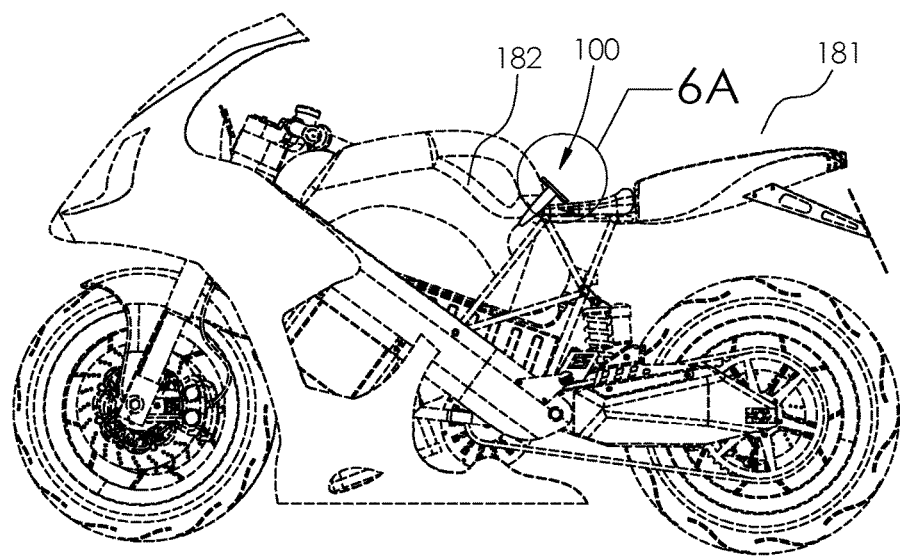
FIG. 6 is a side in-use view of a device of the disclosure.
Figure 7:
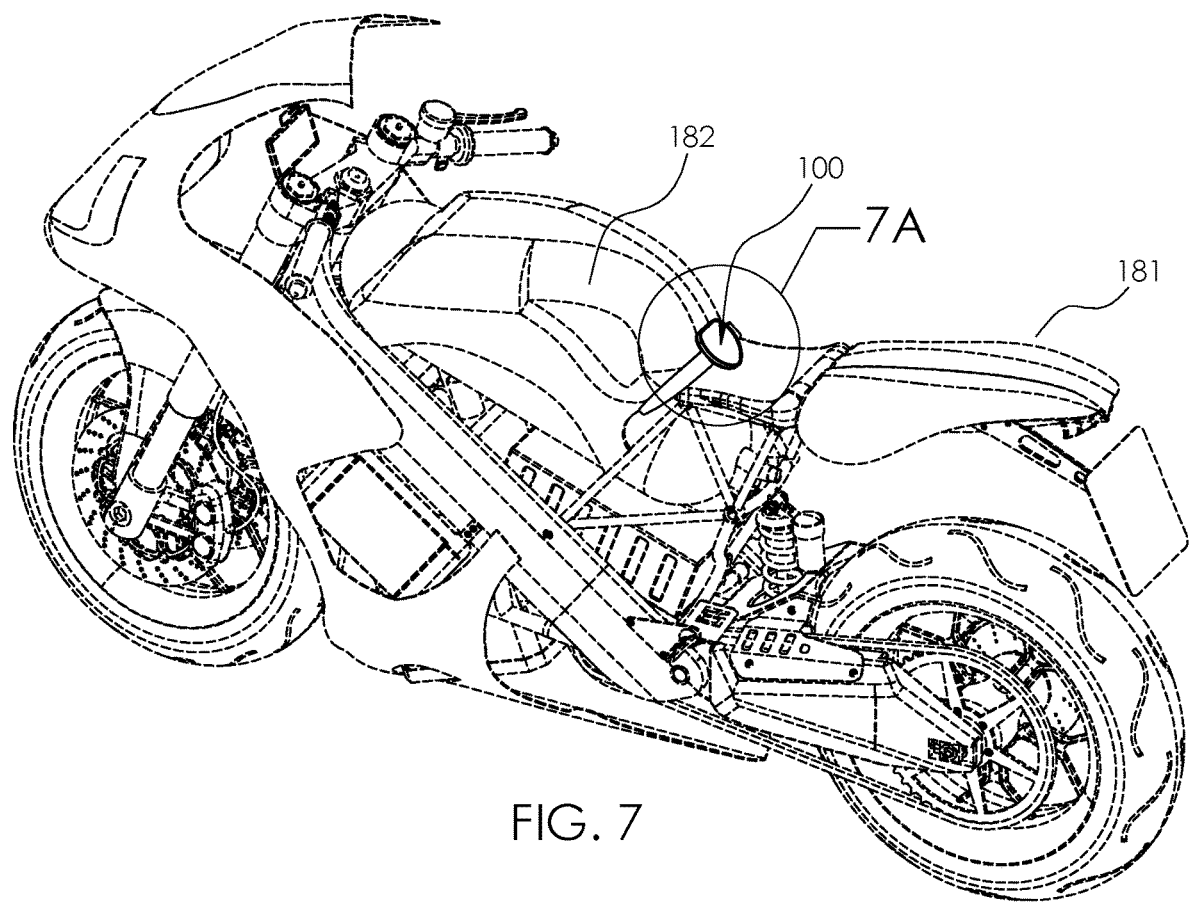
FIG. 7 is a side in-use view of a device of the disclosure.
Figure 7A:
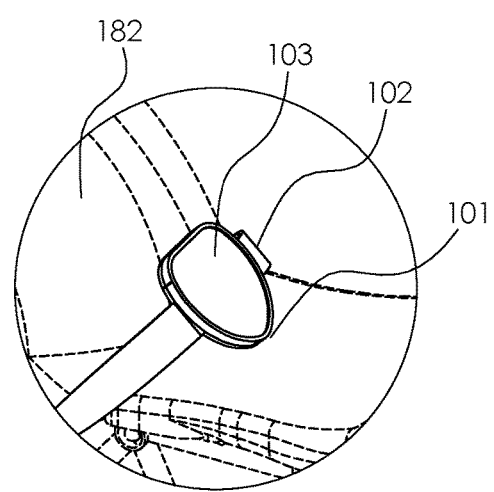
FIG. 7A is a detail view of a device of the disclosure.

Detailed reference will now be made to one or more potential embodiments of the disclosure, which are illustrated in FIGS. 1 through 7A.

The motorcycle groin protector 100 (hereinafter invention) is a guard. The invention 100 is configured for use with a motorcycle 181. The motorcycle 181 is further defined with a fuel tank 182. The invention 100 forms a guard around a groin 192 of a rider 191. The invention 100 comprises a rigid shell 101, a clip 102, and a comfort cushion 103. The clip 102 attaches the rigid shell 101 to the fuel tank 182 of the motorcycle 181. The comfort cushion 103 attaches to the rigid shell 101. The rigid shell 101 protects the groin 192 of a rider 191.

The comfort cushion 103 is a pad mounted in the rigid shell 101. The comfort cushion 103 forms the superior surface of the rigid shell 101. The comfort cushion 103 is a semi-rigid structure with an elastic nature. The comfort cushion 103 is configured to prevent impact injury to the rider 191 of the motorcycle 181.

The clip 102 attaches the rigid shell 101 to the fuel tank 182 of the motorcycle 181. The clip 102 acts as a spring. The clip 102 forms a cantilever V spring. The cantilever V spring is defined elsewhere in this disclosure.

The cantilever V spring structure of the clip 102 further comprises a first arm 121 and a second arm 122. The first arm 121 is a first cantilever structure that forms a portion of the clip 102. The second arm 122 is the second cantilever structure that forms the balance of the clip 102. The first arm 121 is formed as a non-Euclidean prism structure. The second arm 122 is formed as a non-Euclidean prism structure.

Specifically, when the fuel tank 182 of the motorcycle 181 inserts between the first arm 121 and the second arm 122 of the cantilever V spring structure formed by the clip 102 the first arm 121 is separated from the second arm 122. The separation of the first arm 121 and the second arm 122 applies a torque is applied to the first arm 121 and the second arm 122 such that the cantilever V spring structure formed by the clip 102 attempts to return the first arm 121 and the second arm 122 to their original positions. When fuel tank 182 is placed between the first arm 121 and the second arm 122, the cantilever V spring structure formed by the clip 102 will apply a pressure against the fuel tank 182 through the first arm 121 and the second arm 122 that effectively attaches the invention 100 to the selected fuel tank 182.

The rigid shell 101 is a rigid structure. The rigid shell 101 has a non-Euclidean disk shape. The form factor of the rigid shell 101 is geometrically similar to the form factor of the aft end of the fuel tank 182 of the motorcycle 181. Specifically, the inferior surface of a portion of the rigid shell 101 is geometrically identical to the form factor of the superior surface of a portion of the fuel tank 182 such that the rigid shell 101 rests directly on the superior surface of the fuel tank 182. The terms inferior and superior are defined in greater detail elsewhere in this disclosure.

The rigid shell 101 comprises a center plate 112 and magnetic plate 114. The magnetic plate 114 attaches to the center plate 112.

The center plate 112 is the primary plate of the rigid shell 101. The center plate 112 has a non-Euclidean disk-shaped structure. The center plate 112 has a pan structure. The center plate 112 is geometrically similar to the form factor of the aft end of the fuel tank 182 of the motorcycle 181. The center plate 112 is geometrically similar to the form factor of the superior surface of a portion of the magnetic plate 114 such that a portion of the center plate 112 rests directly on the superior surface of the magnetic plate 114.

The comfort cushion 103 is geometrically similar to the hollow interior of the pan structure of the center plate 112 such that the comfort cushion 103 inserts into the hollow interior of the center plate 112.

The first arm 121 attaches to the lateral face of the disk structure of the center plate 112 to form the cantilever V spring structure of the clip 102. The second arm 122 attaches to the lateral face of the disk structure of the center plate 112 to form the cantilever V spring structure of the clip 102. The first arm 121 is formed from a magnetized metal such that the first arm 121 magnetically attaches to the fuel tank 182 of the motorcycle 181. The second arm 122 is formed from a magnetized metal such that the second arm 122 magnetically attaches to the fuel tank 182 of the motorcycle 181.

The magnetic plate 114 is the plate of the rigid shell 101 that attaches the rigid shell 101 to the fuel tank 182 of the motorcycle 181. The magnetic plate 114 112 has a disk-shaped structure. The magnetic plate 114 is geometrically identical to the form factor of the aft end of the fuel tank 182 of the motorcycle 181. The magnetic plate 114 is geometrically identical to the form factor of the inferior surface of the center plate 112 such that the magnetic plate 114 fits flush to the center plate 112.

The magnetic plate 114 is formed from a magnetized metal such that the magnetic plate 114 magnetically attaches to the fuel tank 182 of the motorcycle 181.

To attach the invention 100 to the motorcycle 181, the inferior surface of the rigid shell 101 is placed over the aft end of the fuel tank 182 of the motorcycle 181.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Anterior: As used in this disclosure, anterior is a term that is used to refer to the front side or direction of a structure. When comparing two objects, the anterior object is the object that is closer to the front of the structure.

Bow: As used in this disclosure, the bow refers to the anterior side of an object, vehicle, or vessel. Specifically, the bow refers to the most forward element of the object in the direction of the primary sense of direction of the object vehicle, or vessel.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cantilever V Spring: As used in this disclosure, a cantilever V spring is a torsion spring that is formed in a chevron, hyoid or horseshoe shape. The cantilever V spring comprises a first cantilever structure and a second cantilever structure wherein the fixed end of the first cantilever structure. Within this structure, when a force is applied to the cantilever V spring such that the first cantilever structure moves relative to from the second cantilever structure the force deforms the cantilever V spring in an elastic manner that: 1) resists the application of the force; and 2) stores the energy deformation such that when the force is no longer applied the cantilever V spring returns to its relaxed shape. Depending on the application, a cantilever V spring can be considered a torsion spring, a tension spring, or a compression spring. The term offset cantilever V spring means that the span of the length of the first cantilever structure differs from the span of the length of the second cantilever structure.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Chamber: As used in this disclosure, a chamber is an enclosed or enclosable negative space that is dedicated to a purpose.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Cushion: As used in this disclosure a cushion is a structure formed with a pad that is used to prevent injury or damage to a person or object.

Cycle: As used in this disclosure, a cycle refers to a device selected from the group consisting of a bicycle and a motorcycle.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Flush: As used in this disclosure, the term flush is used to describe the alignment of a first surface and a second surface on a single plane.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is a term that relates a first object to a second object. When the first object is closer to the bow of a vehicle, the first object is said to be forward of the second object. The term is commonly used on vessels and vehicles.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Groin: As used in this disclosure, the groin is the area of the body where the thighs join the abdomen.

Guard: As used in this disclosure, a guard is an inert structure that attaches to or encloses a structure such that the guard forms a barrier intended to prevent objects from crossing a boundary.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field.

Motorcycle: As used in this disclosure, a motorcycle is a commercially available motorized vehicle with two wheels that is intended for carrying one or more passengers.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Structure: As used in this disclosure, a non-Euclidean structure is a structure wherein an axis of the structure lies on a non-Euclidean plane.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pad: As used in this disclosure, a pad is a mass of soft material used as a filling or for protection against damage or injury. Commonly used padding materials include, but are not limited to, polyurethane foam, silicone, a polyester fill often referred to as fiberfill or polystyrene beads often referred to as stuffing beans or as bean bag chair beans.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan. A semi-enclosed pan refers to a pan wherein an end of prism structure of the pan and a portion of the lateral face of the pan is also open.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Rectilinear Block: As used in this disclosure, a rectilinear block refers to a three-dimensional structure comprising a plurality of rectangular surfaces. Rectilinear blocks are similar to rectangular blocks and are often used to create a structure with a reduced interior volume relative to a rectangular block. Within this disclosure, a rectilinear block may further comprise rounded edges and corners.

Rigid Structure: As used in this disclosure, a rigid structure is a solid structure formed from an inelastic material that resists changes in shape. A rigid structure will permanently deform as it fails under a force.

Rounded: A used in this disclosure, the term rounded refers to the replacement of an apex, vertex, or edge or brink of a structure with a (generally smooth) curvature wherein the concave portion of the curvature faces the interior or center of the structure.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Textile: As used in this disclosure, a textile is a material that is woven, knitted, braided or felted. Synonyms in common usage for this definition include fabric and cloth.

Vehicle: As used in this disclosure, a vehicle is a motorized device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 7A include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle guard comprising
a rigid shell, a clip, and a comfort cushion;
wherein the clip attaches the rigid shell to the fuel tank of a motorcycle;
wherein the comfort cushion attaches to the rigid shell;
wherein the vehicle guard is a guard;
wherein the vehicle guard is configured for use with a motorcycle;
wherein the motorcycle is further defined with a fuel tank;
wherein the rigid shell is adapted to protect the groin of a rider;
wherein the comfort cushion is a pad mounted in the rigid shell.

2. The vehicle guard according to claim 1
wherein the comfort cushion forms the superior surface of the rigid shell;
wherein the comfort cushion is a semi-rigid structure with an elastic nature.

3. The vehicle guard according to claim 2 wherein the clip forms a cantilever V spring.

4. The vehicle guard according to claim 3
wherein the cantilever V spring structure of the clip further comprises a first arm and a second arm;
wherein the first arm is formed as a non-Euclidean prism structure;
wherein the second arm is formed as a non-Euclidean prism structure.

5. The vehicle guard according to claim 4 wherein the fuel tank of the motorcycle inserts between the first arm and the second arm of the cantilever V spring structure formed by the clip.

6. The vehicle guard according to claim 5 wherein the first arm and the second arm attach the vehicle guard to the selected fuel tank.

7. The vehicle guard according to claim 6
wherein the rigid shell is a rigid structure;
wherein the rigid shell has a non-Euclidean disk shape.

8. The vehicle guard according to claim 7 wherein the rigid shell rests directly on the superior surface of the fuel tank.

9. The vehicle guard according to claim 8
the rigid shell comprises a center plate and a magnetic plate;
wherein the magnetic plate attaches to the center plate.

10. The vehicle guard according to claim 9
wherein the center plate has a non-Euclidean disk-shaped structure;
wherein the center plate has a pan structure;
wherein the magnetic plate is the plate of the rigid shell that attaches the rigid shell to the fuel tank of the motorcycle.

11. The vehicle guard according to claim 10
wherein the center plate is geometrically similar to the form factor of the fuel tank of the motorcycle;
wherein the center plate is geometrically similar to the form factor of the superior surface of a portion of the magnetic plate.

12. The vehicle guard according to claim 11 wherein the comfort cushion is geometrically similar to a hollow interior of the pan structure of the center plate such that the comfort cushion inserts into the hollow interior of the center plate.

13. The vehicle guard according to claim 10
wherein the first arm attaches to a lateral face of the disk structure of the center plate;
wherein the second arm attaches to the lateral face of the disk structure of the center plate.

14. The vehicle guard according to claim 13
wherein the first arm is formed from a magnetized metal such that the first arm magnetically attaches to the fuel tank of the motorcycle;
wherein the second arm is formed from a magnetized metal such that the second arm magnetically attaches to the fuel tank of the motorcycle.

15. The vehicle guard according to claim 14 wherein the magnetic plate has a disk-shaped structure.

16. The vehicle guard according to claim 15 wherein the magnetic plate is geometrically identical to the form factor of the aft end of the fuel tank of the motorcycle.

17. The vehicle guard according to claim 16 wherein the magnetic plate is geometrically identical to the form factor of the inferior surface of the center plate such that the magnetic plate fits flush to the center plate.

18. The vehicle guard according to claim 17 wherein the magnetic plate is formed from a magnetized metal such that the magnetic plate magnetically attaches to the fuel tank of the motorcycle.

* * * * *